INVENTOR.
KENNETH H. DUFRANE 3,278,385
REACTOR CONTROL ROD DRIVE MECHANISM
Kenneth H. Dufrane, Baltimore, Md., assignor to Martin Marietta Corporation, New York, N.Y., a corporation of Maryland
Filed June 4, 1964, Ser. No. 372,594
9 Claims. (Cl. 176—36)

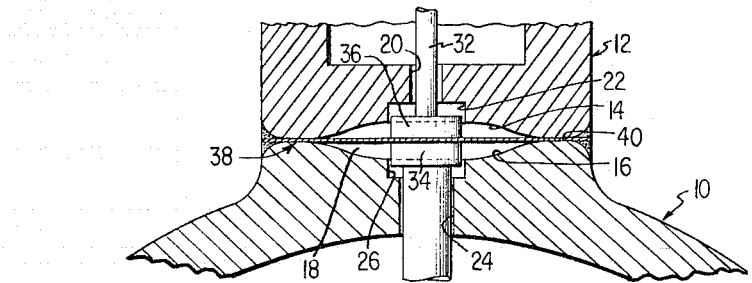
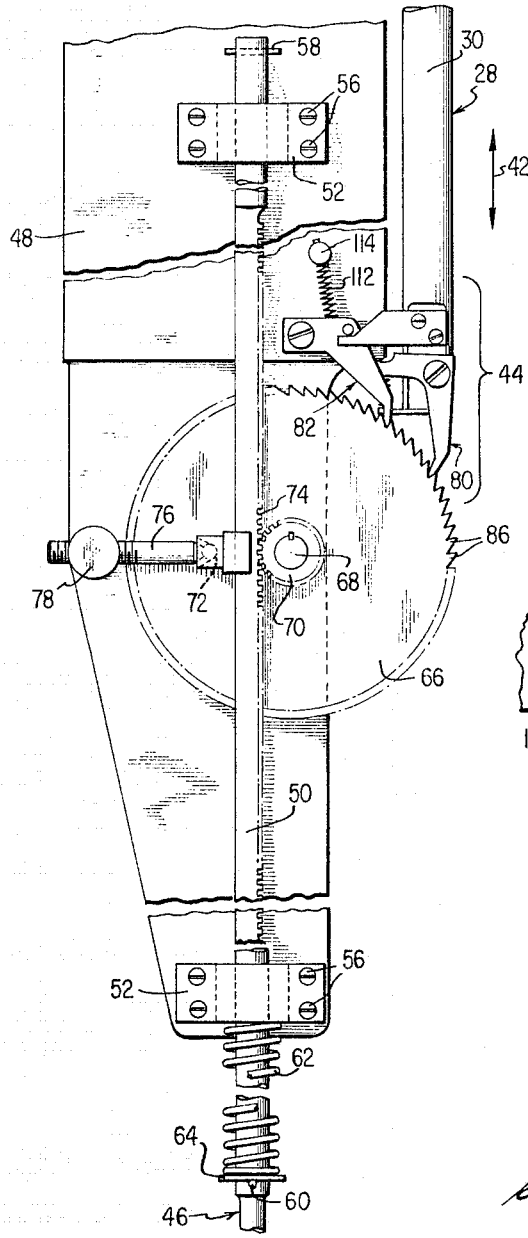
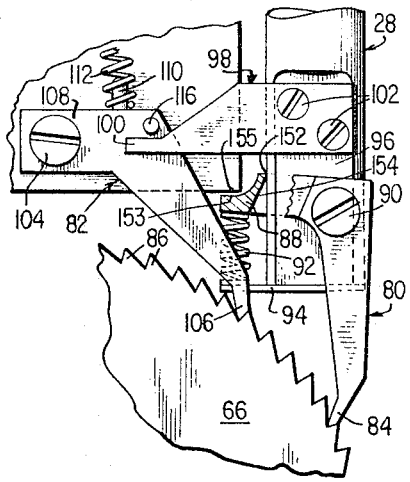
FIG. 1
FIG. 2
INVENTOR.
KENNETH H. DUFRANE

This invention relates in general to nuclear reactors and more particularly to the reactor control rod drive mechanism incorporated therein.

In most conventional nuclear reactors, the reaction is controlled by the insertion, to a greater or lesser extent, of a neutron absorbing, regulating means into the reactive composition. When fully inserted, the reaction will be stopped by neutron absorption in the rod, but when partially withdrawn to what is commonly termed the "critical position," the neutron reproduction ratio is unity. Withdrawal of the control rod beyond the critical position ultimately produces a neutron reproduction ratio over unity and neutron density within the reactor will then rise. The return of the control rod to the critical position will then act to hold the reaction at the desired power or neutron density level. Many reactors operate with movable mechanical apparatus to automatically regulate the reactor to the condition of criticality during moderate variations in operating parameters, requiring the reactor to be constantly monitored, with resultant movement of the control rod in either direction to effect desired control. Others, after initial criticality and power level are established, may continue to operate for extended periods of time without further rod motion by means of inherent self regulating characteristics of the over-all reaction process.

In either system, the reaction is occurring within the reactor body proper under conditions involving both extreme temperature and pressure differentials, as well as high radioactivity. Reactor concepts involving shallow water startup with subsequent deep submergence, require mechanisms that must remain intact and leak tight under differential pressures of 10,000 p.s.i. or more while providing the means for operating the control rods at lower pressures.

It is therefore a primary object of the present invention to provide an improved reactor control rod drive mechanism providing fully remote operation, maximum reliability, and, at high differential pressures over 10,000 p.s.i., zero leakage.

It is a further object of this invention to provide a control system of this type which is extremely simple in construction, as well as inexpensive to manufacture.

It is a further object of this invention to provide a control rod drive mechanism of this type which eliminates the need for rotating or translating pressure seals and in which positive displacement is achieved from an initiating mechanism exterior of the reactor body to the control rod within the critical region without slippage, regardless of control rod weight.

It is a further object of this invention to provide an improved control rod drive mechanism of this type which is inherently safe by its capability of scramming as a result of excessive pressure.

Further objects of this invention will be pointed out in the following detailed description and claims and illustrated in the accompanying drawings which disclose, by way of example, the principal of this invention and the best mode which has been contemplated of applying that principal.

In the drawings, FIGURE 1 is a side elevational view, partially in section of a preferred embodiment of the present invention.

FIGURE 2 is an enlarged view, partially in section of a portion of the apparatus shown in FIGURE 1.

Figure 4:
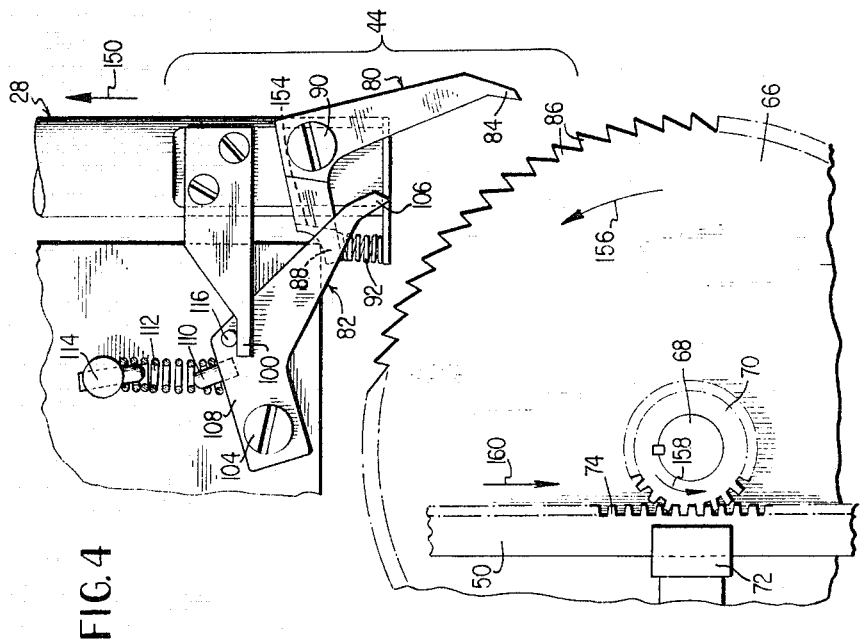
FIGURE 4 is a side elevational view of a portion of the apparatus shown in FIGURE 1 showing the method of operation during scramming.

In general, the present invention is directed to an improved reactor control rod drive mechanism for a nuclear reactor having one or more control rods therein, said reactor further having a pressure resistant, main reactor section, including an opening therein, an actuator rod extending axially within said opening, with the actuator rod having a diameter substantially less than the diameter of said opening. A flexible plate is fixed to said rod and surrounds the same. Means are provided for securing the outer edge of said plate to the main reactor section about the edge of said opening to allow limited axial oscillation of said rod by flexure of the plate. Further means within the main reactor section are positioned in operative relation to the inner end of said actuator rod to effect incremental movement of said control rod in one direction to increase reactivity and sustained movement of said control rod in the opposite direction to scram.

Referring to the drawings, there is shown one embodiment of the improved reactor control rod drive mechanism of the present invention as applied to a conventional nuclear reactor, including a main reactor section or housing indicated at 10, including a cap 12. The section 10 and the cap 12 are provided with opposed tapered or contoured surfaces 14 and 16 respectively, forming a large diameter cavity 18 at the line of juncture between these elements. The cap 12 further includes a first bore 20 of relatively small diameter and a second counterbore 22 of a somewhat larger diameter. The larger bore section 22 terminates adjacent the tapered surface 14. In like manner, the main reactor section 10 includes a first bore 24 relatively small diameter and a counterbore 26 adjacent tapered surface 16. In this manner, one or more actuator rods 28 are axially positioned therein, such that an inner section 30 extends within the reactor section 10 while a smaller diameter section 32 extends exteriorally of the reactor section. The inner section 30 of the actuator rod includes a large collar 34 while the outer end 32 of the actuator rod includes an enlarged collar 36. A flexible diaphragm 38 in the form of a thin sheet steel plate is sandwiched between collars 34 and 36 with the outer end 40 of the plate being welded, clamped, or otherwise secured between cap 12 and main reactor section 10. The outer edge 40 of the diaphragm and the cap 12 and main reactor section 10 also forms a high pressure seal at this point while plate 38 likewise forms a high pressure seal dividing cavity 18 into high and low pressure sections.

It is readily apparent that by the use of the flexible plate 38, mechanical motion in the form of limited oscillation of the inner end 30 of actuator rod 28 may be achieved as indicated by the arrow 42. The limit of motion may be defined by either the seating of the respective collars 34 and 36 within counterbores 22 and 26, or contact between the surfaces of flexible plate 38 and the inclined faces 14 and 16 of the surfaces forming cavity 18, or both. Thus, mechanical push-pull motion is provided to the flexible plate 38 from an external motion source, either electrical, magnetic, mechanical or hydraulic (not shown) by means of exterior actuator rod section 32. This technique allows mechanical motion to be supplied across the high pressure wall formed by main reactor section 10 the reactor coolant area therein in a completely leak proof manner. The collars 34 and 36 and the respective counterbores 26 and 22 provide a backup support structure on either side of the flexible plate 38 both to limit motion and to take up the high differential pressure loads that may be encountered. Essentially, at high differential pressures, the flex plate 38 will deform as required to allow the tapered plate supporting surfaces 14 or 16 and counterbore 22 or 26 to assume the complete load. The backup plates or tapered supporting surfaces 14 and 16 are thus contoured to minimize the induced stresses in the flexible plate as a result of the high pressure differentials. In a preferred form, the counterbores 22 and 26 allow the actuator rod 30 through the collars 34 and 36 to bottom simultaneously with the flexible plate 38 as it bears against the contour thus limiting all stresses imposed in the flex plate to an acceptable level regardless of the pressures encountered.

The actuator mechanism drive rod 30 is used to supply motion to a pawl and ratchet drive mechanism indicated generally at 44 for effecting the desired movement to the control rod 46. To this end, a supporting plate 48 is fixedly coupled to the main reactor section 10 and acts to hold control rod and integral rack 50 in a vertical position through the use of spaced guide members 52. The guide members 52 are physically coupled to plate 48 by bolts 56 or other means. The rack section 50 is therefore free to move in either direction along a vertical axis between the limits defined by a first transverse pin 58 positioned on rod 46 above the upper guide 52 and a second transverse pin 60 positioned on rod 46 below the lower guide 52. The control rod 46 is biased in a downward direction by compression (scram) spring 62 which is positioned between the lower guide 52 and pin 60. A suitable washer 64 may be positioned on rod 46 between the spring 62 and pin 60 to insure proper positioning of scram spring 62 on control rod 46.

A circular ratchet member 66 or wheel is mounted for rotation about a horizontal axis through the use of shaft 68. Circular ratchet wheel 66 and an associated pinion 70 are keyed to the shaft 68 for rotation about the shaft axis with the pinion 70 engaging the rack 50. In order to insure proper engagement between pinion 70 and rack 50, there is provided an adjustable guide 72 which is positioned on the side of the rack segment 50 opposite rack teeth 74. The guide 72 is adjustably positioned as a result of threaded rod 76 which is received by a support member 78 fixed to plate 48. It is obvious therefore, that as ratchet wheel 66 rotates about the axis of shaft 68, the control rod 46 will move in either direction along a vertical axis depending upon the direction of rotation of ratchet wheel 66.

The movement of the ratchet member 66 in either of two directions is achieved through the pawl and ratchet mechanism indicated generally at 44. In addition to ratchet wheel 66, this portion of the mechanism comprises principally a pair of spring biased, pivotable pawl members 80 and 82. As indicated best in FIGURE 2, pawl 80 is generally L-shaped in configuration, and includes a downwardly projecting ratchet engaging end 84 which engages the teeth 86 of the circular ratchet. Pawl member 80 further includes a right angle extension portion 88 extending horizontally away from the pivot point formed by a mounting screw 90. In order to facilitate mounting of pawl 80 on actuator rod 28, the lower end of the rod is flattened as at 96. The pawl is biased in a clockwise or engaging direction through the use of a compression coil spring 92 which is positioned between the extension arm 88 and a fixed stop 94 mounted on actuator rod 28. Pawl 90 is thus pivotally mounted at the end of actuator rod 28 and is biased in a position such that it will normally engage one of the teeth 86 of ratchet wheel 66. A lifting arm 98 having a pin contacting surface 100 is also fixed to the flattened surface 96 of actuator rod 28 and extends generally in a horizontal direction away from the vertical axis of rod 28, the lifting arm 98 being fixedly mounted through the use of two screws 102.

The second pawl member 82 is pivotally mounted to the fixed plate 48 for pivoting about the axis defined by mounting screw 104. The pawl member 82 is likewise L-shaped having a ratchet engaging portion 106 which extends from the horizontal mounting portion 108. The pawl further includes an upstanding pin 110 which acts to receive one end of compression spring 112, the other end being fixed to the mounting plate 48 as at 114. The compression spring 112 tends to pivot pawl member 82 about the axis of mounting screw 104 in a clockwise direction, to engage portion 106 within one of the teeth 86 of ratchet 66. The pawl member 82 further includes a second pin 116 which extends outwardly in a horizontal direction away from the plate 48 in the path of movement of the lifting arm 98.

Figure 3:
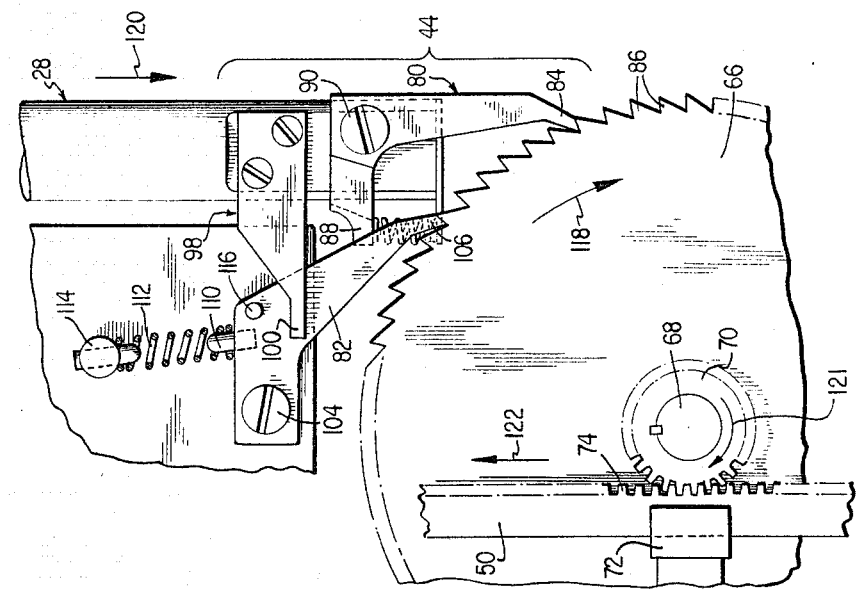
FIGURE 3 is a side elevational view of a portion of the apparatus shown in FIGURE 1 showing the method of operation involving incremental raising of the control rod.

In operation, the pawl and ratchet mechanism performs two functions, depending upon the direction of flexing of plate 38 from its null or centered position to a position in which either collar 34 bottoms against counterbore 26 or collar 36 bottoms against counterbore 22. During normal operation, the movement of rod 28 is from the null or center position to a position in which collar 34 seats within counterbore 26. Thus, an incremental downward movement of actuator rod 28 occurs. Movement of rod 28 in a downward direction results in the end 84 of pawl 80 effecting an incremental clockwise rotation of ratchet 66. Reference to FIGURE 3 shows most clearly the effect of a downward movement of actuator rod 28 which results in a relative movement of rod 28 with respect to the fixed mounting plate 48. The distance travelled by the movement of rod 28 with respect to plate 48 may be best appreciated by noting the displacement between the end 100 of lifting arm 98 and the pin 116 associated with pawl 82. The downward movement of actuator rod 28 will produce a force sufficient to rotate the ratchet member 66 against the bias of spring 62, rather than the opposite tendency to rotate the pawl 80 about the axis of mounting screw 90 against the bias of compression spring 92. By selecting the proper geometry for pawl 80, the load could also be made to tend to rotate it in a counterwise manner. This is prevented by contact of surface 152 (FIG. 2) with actuator rod 28. Thus, incremental clockwise rotation of ratchet 66 is achieved as indicated by the arrow 118 with the downward movement of the actuator rod 28 being indicated by arrow 120. As a result of clockwise rotation of ratchet 66, pinion 70 likewise rotates an incremental distance in the same direction as indicated by arrow 120 with resultant incremental movement of rack section 50 of the control rod a proportional distance in an upward direction as indicated by arrow 122. At the same time, the pawl 82 which is biased in a clockwise direction actually slides over the top of one of the teeth 86 and falls within the next adjacent tooth. Upon return movement of the actuator rod 28 in an upward direction to the null position as indicated in FIGURE 1 with the plate 38 centrally located within cavity 18, the ratchet engaging portion 84 of pawl 80 is disengaged from its respective tooth 86, and moves upwardly into a position where it engages the next adjacent tooth in a counter clockwise direction, a position indicated in FIGURE 2 of the drawings. At the same time, the pawl 82 remains in engagement with associated tooth 86 and prevents counter clockwise rotation of ratchet wheel 66. A sequence of movements of actuator rod 28 from the position in which the plate 38 is in its null position to a position in which it seats against tapered face 16 of main reactor section 10 will affect incremental upward movement of control rod 46.

Should nuclear excursion occur, the improved reactor control rod drive mechanism of the present invention automatically provides a scram action (control rod release). In addition, such action may be initiated at any time in which positive means effect a mechanical movement of actuator rod 28 from a position in which plate 38 is centered within cavity 18 to a position in which the plate bottoms against tapered backing surface 14 and collar 36 seats within counterbore 22. In an "inherent safety type operation," excessive pressures within the main reactor body 10 result in an extreme pressure differential being set up across flexible plate 38. Upward flexure of the plate results in carrying actuator rod 28 therewith to a position mentioned previously in which collar 36 seats within counterbore 22 and with any overstress in the plate caused by a high pressure differential being prevented by the backing surface 14.

Reference to FIGURE 4 shows the effect of this operation on the pawl and ratchet mechanism 44. As rod 28 moves upwardly, indicated by arrow 150, the pawl 80 tends to pivot further in a clockwise direction around the pivot formed by mounting screw 90. Normally spring 92 biases pawl 80 clockwise to a position where edge 153 of lateral extension 88 contacts fixed ledge 155 of support member 48.

At the same time, movement of actuator rod 28 in an upward direction results in lifting of arm 98 to a position where the extended surface 100 contacts pin 116 rotating the second pawl member 82 in a counter clockwise direction against the bias of compression spring 112. This, of course, lifts the blocking or latching pawl 82 from a position where end 106 is in engagement with one of the teeth 86 of ratchet wheel 66, thus freeing the ratchet wheel 66 for rotation in a counter clockwise direction as indicated by arrow 156. Pinion gear 70 rotates in a counter clockwise direction as indicated by arrow 158 causing a downward movement of the control rod 46. The downward movement of the control rod 46 is accelerated by the release of the compression scram spring 62, insuring prompt response which is needed for "scram action." Upon a reduction in the extreme pressure differential or as a result of positive mechanical action, downward movement of actuator rod 28 places the plate 38 in a null position to again effect engagement between both pawl members 80 and 82 with the ratchet wheel 66, this position being indicated in FIGURES 1 and 2.

From the above, it is apparent that the improved reactor control rod drive mechanism of the present invention consists of a mechanical device which allows an external actuating force to be transmitted through a pressure vessel wall with the motion then used to drive a simplified jacking mechanism to provide the desired control rod motion. In performing this function, the improved construction of the present invention is not only inexpensive and reliable as well as inherently safe due to the automatic scram on over pressure, but the device completely eliminates the need for rotating or translating pressure seals since the system is completely contained. In addition, movement is achieved in the form of positive displacement eliminating any possible slippage without compromise to control rod weight limitations.

While there have been shown and described and pointed out the fundamental novel features of the invention as applied to a preferred embodiment, it will be understood that various omissions and substitutions and changes in the form and detail of this system illustrated and in its operation may be made by those skilled in the art without departing from the spirit of the invention. It is the intention, therefore, to be limited only as indicated by the scope of the following claims.

What is claimed is:

1. An improved reactor control rod drive mechanism for a nuclear reactor having a pressure resistant main reactor section including an opening therein and at least one control rod positioned therein for limited movement with respect to said reactor section, a flexible plate extending across said opening in sealing relation thereto, an actuator rod fixed to said plate and passing axially therethrough with the diameter of said actuator rod being substantially less than the diameter of said opening whereby flexure of said plate allows limited axial oscillation of said actuator rod and coupling means positioned within said main reactor section, for coupling said actuator rod to said control rod and responsive to movement of said actuator rod to effect incremental movement of said control rod in one direction to increase reactivity and sustained movement of said control rod in the opposite direction for scramming.

2. The apparatus as claimed in claim 1 wherein said control rod movement effecting means includes a pawl and ratchet mechanism.

3. The apparatus as claimed in claim 1 wherein said control rod movement effecting means positioned within said main reactor comprises a ratchet wheel mounted for free rotation about its axis, motion transfer means for connecting said wheel to said rod for changing rotation of said wheel to longitudinal movement of said control rod, a first pawl member mounted on the end of said actuator rod to effect incremental rotation of said wheel in a first direction and a second pawl member mounted on said ratchet wheel support means in operative engagement with said ratchet wheel to normally prevent reverse rotation of said wheel.

4. The apparatus as claimed in claim 3 wherein said actuator rod includes means fixed thereto for disengaging said first and second pawl members simultaneously from said ratchet wheel to effect sustained movement of said control rod in a direction to produce "scram action."

5. An improved reactor control rod drive mechanism for a nuclear reactor having a pressure resistant main reactor section including an area having a first bore, a counterbore adjacent the outer surface of said section and a contoured backup surface adjacent said counterbore, said backup surface tapering inwardly toward the axis of said bore and counterbore, a cap member covering said area of said main reactor section, said cap member including in axial alignment with said main reactor section a bore, a counterbore, and a contoured backup surface of said cap member, all of which face said main reactor section, said contoured surfaces of said cap and said main reactor section forming a cavity therebetween of diamond shaped cross sectional configuration, a flexible plate positioned between said cap and said main reactor section and acting to divide said cavity into two equal portions, an actuator rod fixed to said plate and passing axially through said cavity, said bores and said counterbores, collar members fixed to said actuator rod on opposite sides of said flexible plate and adapted to seat within said respective counterbores to limit axial oscillation of said rod as a result of flexing of said plate, the diameter of said rod being substantially less than the diameter of said cavity whereby flexure of said plate allows limited oscillation of said actuator rod, and coupling means positioned within said main reactor section for coupling said actuator rod to said control rod and responsive to movement of said actuator rod to effect incremental movement of said control rod in one direction to increase reactivity and sustained movement of said control rod in the opposite direction to effect a scram action.

6. The apparatus as claimed in claim 5, wherein said means to effect movement of said control rod within said main reactor section comprises a pawl and ratchet mechanism.

7. The apparatus as claimed in claim 5, wherein said means to effect movement of said control rod includes a ratchet wheel, means for supporting said ratchet wheel for free rotation about its axis, first gear means fixed to said ratchet wheel for rotation therewith and second gear means fixed to said control rod for transforming rotational movement of said ratchet wheel to longitudinal movement of said control rod, a first pawl member mounted on the end of said actuator rod within said main reactor section for engagement with said ratchet wheel to effect incremental rotation of said wheel in a first direction, a second pawl member fixed to said ratchet wheel support means for engagement with said ratchet wheel to normally prevent reverse rotation of said ratchet wheel as said first pawl is disengaged from one tooth and reengages the next succeeding tooth.

8. The apparatus as claimed in claim 5, wherein said control rod includes means tending to bias said rod for movement in a direction tending to effect a "scram action," and said actuator rod includes means for disengaging both of said pawl members from said ratchet wheel during upward movement of said actuator rod from a null position to a position wherein said collar exterior of said plate seats within the counterbore formed within said cap member.

9. An improved reactor control rod drive mechanism for a nuclear reactor having a pressure resistant, main-reactor section including an opening therein and at least one control rod position within said main reactor section for limited movement therewith, a flexible plate extending across said opening in sealing relation thereto, an actuator rod fixed to said plate and passing axially therethrough, the diameter of said rod being substantially less than the diameter of said opening whereby flexure of said plate allows limited oscillation of said actuator rod, backup members positioned on opposite sides of said plate for contact with respective, opposed surfaces of said plate during movement of said actuator rod to either extreme position, said rod normally occupying a null position in which said plate extends transversely at right angles to the axis of said opening, and means positioned within said main reactor section in operative relation to the inner end of said actuator rod and connected to said control rod and responsive to movement of said actuator rod from said null position to respective extreme positions to effect incremental movement of said control rod in one direction to increase reactivity and to effect sustained movement of said control rod in the other direction to produce "scram action."

No references cited.

L. DEWAYNE RUTLEDGE, *Primary Examiner.*

REUBEN EPSTEIN, *Examiner.*

M. R. DINNIN, H. E. BEHREND, *Assistant Examiners.*